Dec. 4, 1923.
A. McDOUGALL
PEAT FUEL MACHINE
Filed Dec. 30, 1922      2 Sheets-Sheet 1
1,476,407
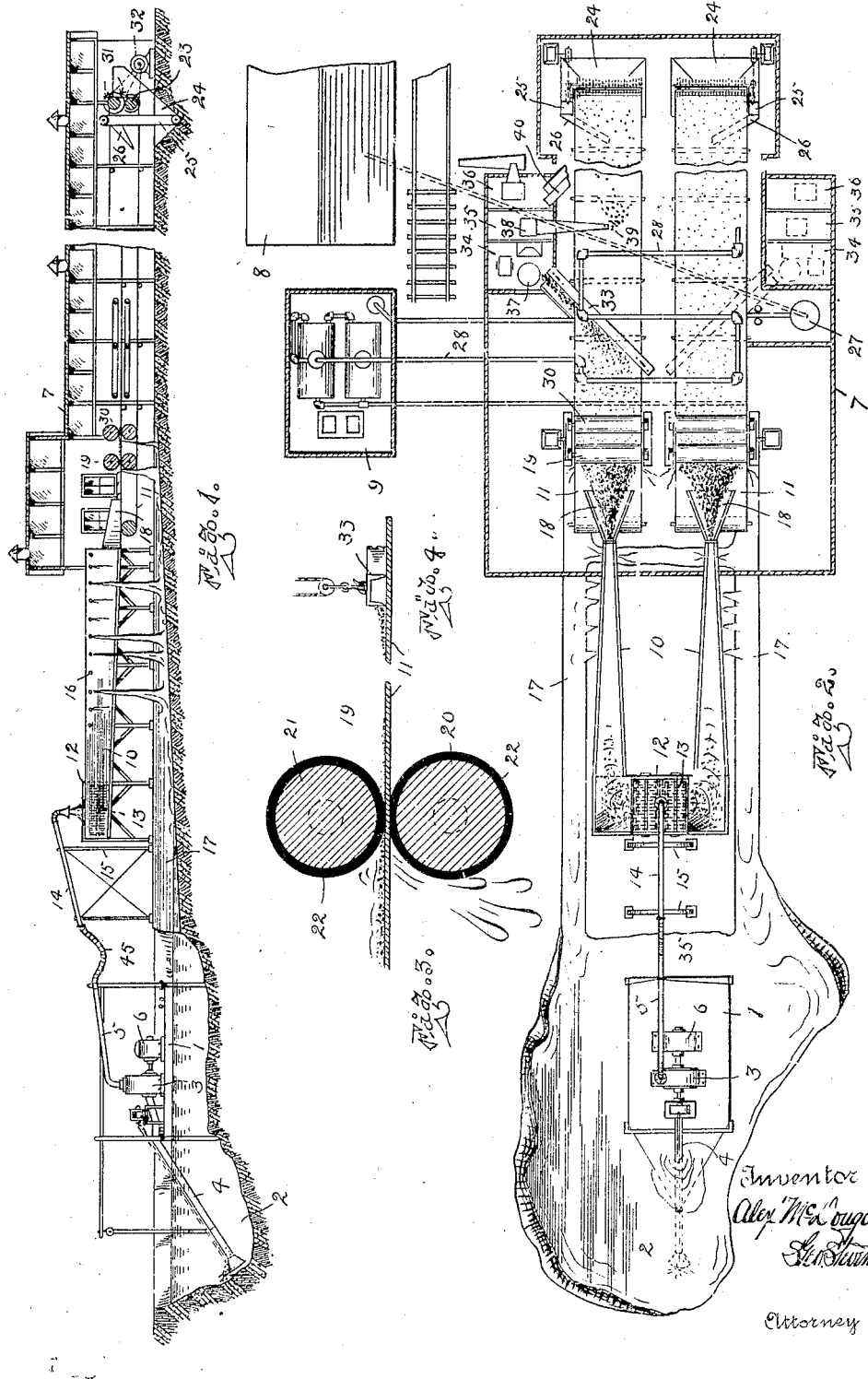

Dec. 4, 1923.  1,476,407
A. McDOUGALL
PEAT FUEL MACHINE
Filed Dec. 30, 1922  2 Sheets-Sheet 2

Inventor
Alex. McDougall.
Geo. Stevens.
Attorney

Patented Dec. 4, 1923.

1,476,407

UNITED STATES PATENT OFFICE.

ALEXANDER McDOUGALL, OF DULUTH, MINNESOTA.

PEAT-FUEL MACHINE.

Application filed December 30, 1922. Serial No. 609,788.

*To all whom it may concern:*

Be it known that I, ALEXANDER McDOUGALL, a citizen of the United States, residing at Duluth, in the county of Saint Louis and State of Minnesota, have invented certain new and useful Improvements in Peat-Fuel Machines, of which the following is a specification, reference being had therein to the accompanying drawings.

This invention relates to the handling of peat or like granular material and includes in the embodiment here illustrated thereof the excavating, conveying and drying of peat; the same being a modification and improvement in the system depicted in my copending application, Ser. No. 490,445, and also embodies features of my other copending application, Ser. No. 504,879.

The principal object of my present invention is to provide a more compact, efficient and practical combination than heretofore known.

Another object is to provide means for drying the greatest area possible of thinly compressed peat, and that during one continuous operation.

Another object is to provide means to more thoroughly dewater the peat during its passage intermediate of the expressing rollers, and to save the water for flotation and further use.

Another object is to provide a compact and practical multiple drying unit capable of producing a finished fuel product either in the form of briquettes or dust or both.

Still other objects and advantages of the improvement will appear in the further description thereof.

Referring to the accompanying drawings forming part of this application in which like reference characters indicate like parts:

Figure 1 represents a vertical sectional view of a peat handling plant involving my invention, parts thereof being in elevation, and parts broken away for convenience of illustration;

Figure 2 is a plan view of the organization shown in Figure 1;

Figure 3 is an enlarged vertical sectional view of the two foremost expressing rollers intermediate of which the peat conveying belt passes;

Figure 4 is an enlarged end view of one form of scraper or switch for scraping the material from the belt.

Figure 5:
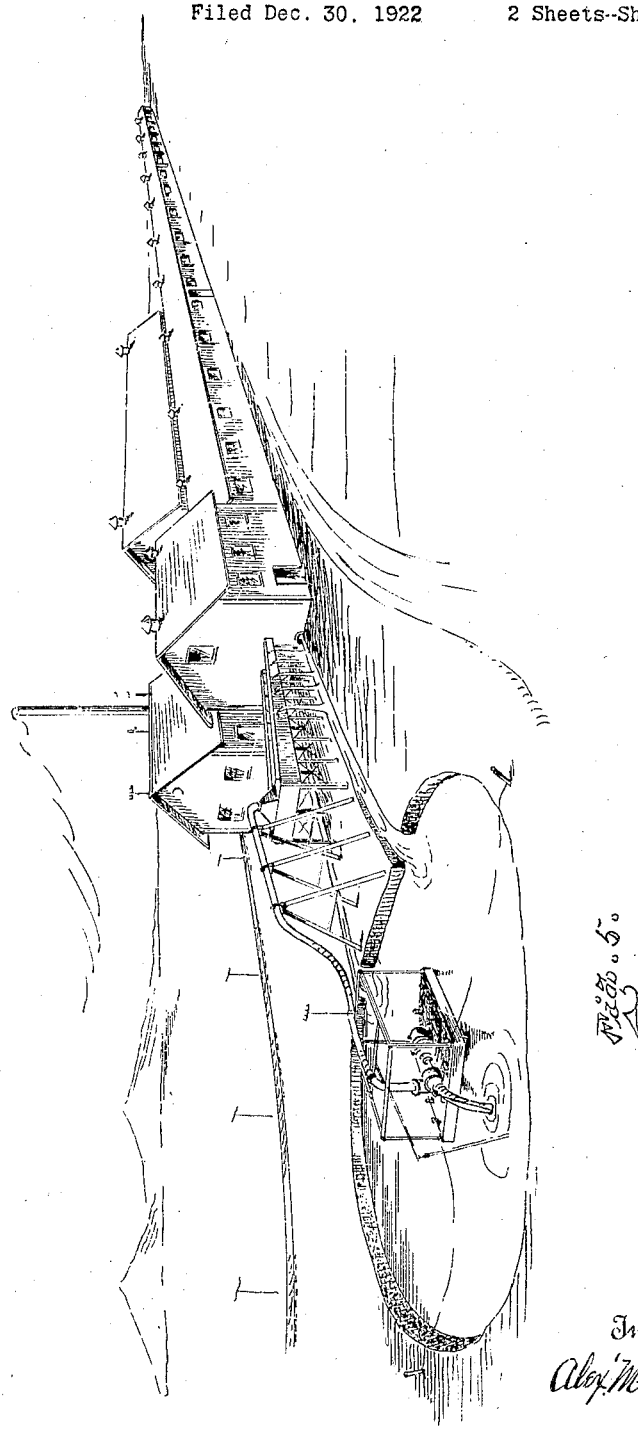
Figure 5 is a perspective view of one of the completely installed plants as it would appear in operation.

At 1 is illustrated a small navigable scow within a body of water 2 which may be as found naturally in peat beds or as artificially formed therein.

Upon this scow is carried a centrifugal pump 3, having a suction 4 and discharge 5, and a motor for driving the pump, which may be either electric or other suitable form, is illustrated at 6.

The outboard end of the suction 4 may be provided with a suitable cutter when desired to assist in loosening up and disintegrating the peat when the pump is being operated and the entire dredging unit may be floated about and moved as the operation of dredging may require, the discharge pipe being flexible and extendible, as is common in such devices.

Some distance from this body of water where the excavation of the material is conducted I propose to install a suitable handling and drying plant comprising one or more buildings and machinery for the purpose, among which are the drying house 7, a storage house 8, and a power house 9.

Intermediate of the drying house 7 and the pool, or body of water, are installed a pair of settling troughs 10, they being elevated somewhat from the ground so as to discharge conveniently upon the conveyor and endless drying belts 11. These troughs have a common receiving and disintegrating receptacle indicated at 12 intermediate of their uppermost ends. This receptacle is rectangular in form and provided with any desired disintegrating or grinding device indicated in dotted lines at 13, and the peat conveying supply pipe 14 discharges directly into the receptacle 12, where the coarser material is thoroughly disintegrated before passing by flotation into the trough 10. There is a short length of this discharge pipe mounted upon a suitable scaffolding 15, said pipe being preferably inclined, as shown in Figure 1 of the drawings. The lower end of this pipe is connected to the flexible discharge 45 of the pump 3, which may be long or short as the relative position of the excavating scow requires. It is evident that in some instances it might be desirable to supply the peat to the disintegrating means separate from the water as for example by a clam-shell bucket or the like, and the commingling take place within the receptacle 12.

The side walls of the troughs 10 are provided with a plurality of horizontally spaced discharge holes 16, through which surplus water is discharged during the process of settling in the troughs. The troughs are preferably narrower towards their lower ends where they discharge upon the belts, and in practice the aim is to discharge the thicker or more viscous contents of the trough onto the belts at a proper rate of speed to permit of quantities of the surplus water necessary in conveying the peat to the trough discharging through the openings 16 and falling downwardly into the return ditches indicated at 17 to the pool 2.

An outwardly flaring apron 18 is provided at the lowermost end of each settling trough which directs the flowing peat onto the belts 11 just in front of the expressing rollers, of which there are two sets for each belt shown in this embodiment, the first pair being illustrated at 19 and the second pair at 30. These rollers are driven in any desired manner, as for example by an electric motor receiving its power from the power house as does also the motor on the excavating scow.

The first pair of expressing rollers indicated at 19, and more specifically referred to as 20 and 21, are provided with a thick circumferential covering of rubber, indicated at 22, which, if of the proper density and thickness, is found in practice to squeeze the water from the peat or other granular substance commingled therewith in a most satisfactory manner. Rubber as a compressing surface used in this way tends to surround each individual particle of granular substance and force the moisture initially therefrom to a greater degree than a metal or other similar hard roller. The second set of rollers 31 upon each belt are covered preferably with a much harder substance than the first, in fact, may be quite solid as the peat when served therebetween on the belt will be in a much more plastic form and thus feed much more readily between the rollers than when held in solution with the larger proportion of water. Both sets of rollers are provided with suitable means for regulating the impingement or pressure upon the belt so that they may be readily adjusted to produce the best results possible under varying conditions and circumstances.

The surplus water as expressed by both sets of rollers is discharged over the sides of the belts and into the return ditches to the pool 2; they of course carrying a certain amount of the lighter granular material with them, but which, as is evident, will be subsequently saved in rehandling through the pump.

In a plant of this character where the aim is to complete the transformation of wet peat into a commercial fuel commodity, it becomes necessary to make the building 7 of considerable length, for example, possibly four or five hundred feet long, but in order to curtail this dimension and thus lessen the cost of installation, I have devised means whereby the compressed peat might remain in contact with the belt during both its outward and inward travel. To accomplish this I incline upwardly the upper portion of the belt as it extends outwardly in the building and cause the extreme outer portion thereof to pass over two vertically spaced rollers indicated at 23. This provides opportunity for catching the dried peat as it passes over the uppermost one of these rollers in a suitable hopper indicated at 24 from whence it is elevated by the vertical elevators 25 and dumped through inclined spouts 26 onto the upper side of the lower portion of the belt, upon which it is returned to a suitable location adjacent the opposite end of the belt. As a means for assisting in the discharge of the compressed peat from the belt, I have illustrated two rotary brushes at 31, operated by a motor 32, which may or may not be required.

At the location to which the peat is returned is installed means, for example a blower 27 or the like, for the ultimate disposition of the finished product, which may be scraped or discharged from the belt in any desired manner, and if necessary ground before it is blown for example into the storage house 8, or a portion thereof discharged directly to the boilers in the power house 9 where it may be employed for producing steam for the heating and drying system and ultimately electric energy for the operation of the various motors associated with the enterprise.

As a scraping off or peat removing means from the belts I provide the scraper as illustrated at 33, which is simply a piece of channel iron turned up-side-down and suspended by suitable block and tackle diagonally above the belt and this may be raised or lowered as desired to properly function. It is obvious that there may be any number of these desired for either or both of the belts.

The steam pipes I have indicated at 28 lead from the boilers to and over the belts 11 where they may be alternated across and above the belts, or intermediate of or below them as preferred, so as to thoroughly heat and dry the peat to the best advantage, the full length of the dry house.

Where two belts are employed, as illustrated, (which is the preferred economical installation), I have provided at either side thereof and adjacent the feeding ends, a plurality of compartments illustrated at 34, 35 and 36, they being for the reception and handling of the product during the completion thereof. For example upon one belt if so desired the scraper 33 may be lowered so as to deflect or switch the peat therefrom into the compartment 34 where it may be further compressed into briquettes through the machine 37 and from thence into the elevator 38 in the compartment 35 where it may be elevated and discharged again onto the belt as at 39 and continue its course thereupon and further drying process. Then on their return on the upper side of the lower portion of the belt they may be again switched off by the scraper 40 into the compartment 36 where they may be elevated and discharged into any place desired either for storage or shipping.

If provision is made in this way for quickly changing the character of the product from the belts the convenience is obvious, and the expressing rollers may be so adjusted as to leave the proper amount of moisture in the film of peat on the belt so that it will be a proper consistency for the best results in shaping through the briquetting machine.

I am aware that various forms of pumping and excavating devices have been used in the handling of peat, also many different methods of preparing the peat after being excavated have been resorted to, but my aim in the present invention is to provide a multiple cooperative unit embodying both the excavating and the ultimate disposition of the product, which unit may be established in its entirety upon a peat bog, and there transform the commodity as illustrated, which I am satisfied would eventually solve the problem of producing a commercial fuel product from peat.

While I have referred to that which is known as bog peat in which there is an abundance of water, it is well known that there are many rich deposits of peat in which the water is not so plentiful, and the advantage of using same over and over again, as afforded by this novel system, is apparent; in which case such feature would be very essential.

In the embodiment here described, I have illustrated the mechanism as being double, there being two drying belts and two troughs, but it is evident that the same may be increased or decreased without departing from the spirit of the invention.

Having thus described my invention, what I claim and desire to secure by Letters Patent, is:

1. An organization of the character described for producing peat fuel, from a continuous traveling body of peat from the place of excavation to the place of storage, comprising an excavator, a settling tank into which the excavator discharges, a long, continuously operated, endless, drying belt upon which the settling tank discharges, said belt being artificially heated, means for expressing water from the peat while on the belt, and means for conveying the dried material from the drying house to the place of storage.

2. A peat fuel making unit comprising a stationary drying house, having artificial heating means associated therewith, a plurality of endless belts having expressing rollers associated therewith, stationary hydraulic settling troughs for feeding a viscous solution of peat and water to the belts, a single disintegrating and macerating device for supplying peat in solution to the troughs, and a portable peat and water excavator yieldably associated with the macerating means.

In testimony whereof I hereunto affix my signature in the presence of two witnesses:

ALEXANDER McDOUGALL.

Witnesses:
S. GEO. STEVENS,
S. W. BRONSON.